United States Patent
Kim et al.

(10) Patent No.: US 11,606,317 B1
(45) Date of Patent: Mar. 14, 2023

(54) TABLE BASED MULTI-FUNCTION VIRTUALIZATION

(71) Applicant: Xilinx, Inc., San Jose, CA (US)

(72) Inventors: Seong Hwan Kim, San Jose, CA (US); Zhiyi Sun, Shanghai (CN); Robert Earl Nertney, Santa Clara, CA (US)

(73) Assignee: Xilinx, Inc., San Jose, CA (US)

( * ) Notice: Subject to any disclaimer, the term of this patent is extended or adjusted under 35 U.S.C. 154(b) by 77 days.

(21) Appl. No.: 17/230,575

(22) Filed: Apr. 14, 2021

(51) Int. Cl.
*H04L 49/90* (2022.01)
*H04L 45/74* (2022.01)

(52) U.S. Cl.
CPC .............. *H04L 49/90* (2013.01); *H04L 45/74* (2013.01)

(58) Field of Classification Search
CPC ........ H03K 19/177; H03K 19/17; G06F 7/38; H03M 1/10; H04L 49/90; H04L 45/74
USPC ........................................................ 370/413
See application file for complete search history.

(56) References Cited

U.S. PATENT DOCUMENTS

| | | | |
|---|---|---|---|
| 6,091,263 A | 7/2000 | New et al. | |
| 6,150,839 A | 11/2000 | New et al. | |
| 6,204,687 B1 | 3/2001 | Schultz et al. | |
| 6,462,579 B1 | 10/2002 | Camilleri et al. | |
| 6,507,211 B1 | 1/2003 | Schultz et al. | |
| 6,525,562 B1 | 2/2003 | Schultz et al. | |
| 6,526,557 B1 | 2/2003 | Young et al. | |
| 6,573,748 B1 | 6/2003 | Trimberger | |
| 6,625,794 B1 | 9/2003 | Trimberger | |
| 6,759,869 B1 | 7/2004 | Young et al. | |
| 6,810,514 B1 | 10/2004 | Alfke et al. | |
| 6,836,842 B1 | 12/2004 | Guccione et al. | |
| 6,888,830 B1 * | 5/2005 | Snyder, II | H04L 47/50 710/52 |
| 6,907,595 B2 | 6/2005 | Curd et al. | |
| 7,024,651 B1 | 4/2006 | Camilleri et al. | |

(Continued)

FOREIGN PATENT DOCUMENTS

| | | |
|---|---|---|
| WO | 2010012568 A1 | 2/2010 |
| WO | 2020097013 A1 | 5/2020 |

OTHER PUBLICATIONS

Xilinx WP437 (v1.0) Aug. 29, 2013, Matt Ruan, et al., Wireless Base Station ZUC Block Cipher Implementation on Zynq-7000 AP SoC, 17 pages.

(Continued)

*Primary Examiner* — Man U Phan
(74) *Attorney, Agent, or Firm* — Kevin T. Cuenot

(57) ABSTRACT

Sharing integrated circuit (IC) resources can include receiving, within a communication endpoint of an IC, a plurality of packets from a plurality of different source virtual entities, determining packet handling data for each packet of the plurality of packets using an acceleration function table stored within the IC, routing each packet of the plurality of packets to one or more selected function circuit blocks of a plurality of function circuit blocks in the IC based on the packet handling data of each respective packet, and processing the plurality of packets using the one more selected function circuit blocks generating a plurality of results corresponding to respective ones of the plurality of packets. The plurality of results are queued within the communication endpoint. Each result is queued based on the packet handling data of the corresponding packet.

20 Claims, 7 Drawing Sheets

(56) References Cited

U.S. PATENT DOCUMENTS

| | | | |
|---|---|---|---|
| 7,057,413 B1 | 6/2006 | Young et al. | |
| 7,109,750 B2 | 9/2006 | Vadi et al. | |
| 7,124,338 B1 | 10/2006 | Mark et al. | |
| 7,138,820 B2 | 11/2006 | Goetting et al. | |
| 7,218,137 B2 | 5/2007 | Vadi et al. | |
| 7,224,184 B1 | 5/2007 | Levi et al. | |
| 7,233,532 B2 | 6/2007 | Vadi et al. | |
| 7,235,999 B2 | 6/2007 | Goetting et al. | |
| 7,302,625 B1 | 11/2007 | Payakapan et al. | |
| 7,466,703 B1* | 12/2008 | Arunachalam | H04L 49/201 370/392 |
| 7,477,072 B1 | 1/2009 | Kao et al. | |
| 7,478,357 B1 | 1/2009 | Mason et al. | |
| 7,482,836 B2 | 1/2009 | Levi et al. | |
| 7,509,617 B1 | 3/2009 | Young | |
| 7,518,396 B1 | 4/2009 | Kondapalli et al. | |
| 7,546,572 B1 | 6/2009 | Ballagh et al. | |
| 7,577,707 B2 | 8/2009 | Hufferd et al. | |
| 7,590,790 B2 | 9/2009 | Wang et al. | |
| 7,599,299 B2 | 10/2009 | Goetting et al. | |
| 7,619,442 B1 | 11/2009 | Mason et al. | |
| 7,640,527 B1 | 12/2009 | Dorairaj et al. | |
| 7,649,885 B1* | 1/2010 | Davis | H04L 45/00 370/392 |
| 7,724,815 B1 | 5/2010 | Raha et al. | |
| 7,746,099 B1 | 6/2010 | Chan et al. | |
| 7,752,349 B2 | 7/2010 | Ishida et al. | |
| 8,102,188 B1 | 1/2012 | Chan et al. | |
| 8,194,666 B2* | 6/2012 | Davis | H04L 47/10 370/392 |
| 8,359,448 B1 | 1/2013 | Neuendorffer | |
| 8,415,974 B1 | 4/2013 | Lysaght | |
| 8,504,373 B2 | 8/2013 | Bansal et al. | |
| 8,660,137 B2* | 2/2014 | Aloni | H04L 49/90 370/451 |
| 8,671,219 B2* | 3/2014 | Davis | H04L 47/2458 709/240 |
| 8,719,750 B1 | 5/2014 | Balzli, Jr. | |
| 8,928,351 B1 | 1/2015 | Konduru | |
| 9,218,443 B1 | 12/2015 | Styles | |
| 9,257,987 B1 | 2/2016 | Molson | |
| 9,722,613 B1 | 8/2017 | Schultz et al. | |
| 10,135,739 B2* | 11/2018 | Raindel | H04L 63/04 |
| 10,447,273 B1 | 10/2019 | Roberts | |
| 10,715,451 B2* | 7/2020 | Raindel | G06F 21/602 |
| 10,725,942 B2 | 7/2020 | Thyamagondlu et al. | |
| 11,005,771 B2* | 5/2021 | Pismenny | H04L 69/22 |
| 11,356,410 B2* | 6/2022 | Gao | H04L 69/22 |
| 11,418,454 B2* | 8/2022 | Pismenny | H04L 47/2483 |
| 2003/0021346 A1 | 1/2003 | Bixby et al. | |
| 2003/0097498 A1 | 5/2003 | Sano et al. | |
| 2004/0019729 A1 | 1/2004 | Kelley et al. | |
| 2005/0114566 A1 | 5/2005 | Chen et al. | |
| 2005/0228913 A1 | 10/2005 | Matthews et al. | |
| 2006/0265531 A1 | 11/2006 | Adams et al. | |
| 2007/0208895 A1 | 9/2007 | Chang et al. | |
| 2008/0279209 A1 | 11/2008 | Hui | |
| 2010/0186014 A1 | 7/2010 | Vaghani et al. | |
| 2010/0321397 A1 | 12/2010 | Ginzburg | |
| 2013/0160016 A1 | 6/2013 | Gummaraju et al. | |
| 2015/0095109 A1 | 4/2015 | Kodde | |
| 2015/0134891 A1 | 5/2015 | Jo | |
| 2016/0203091 A1 | 7/2016 | Lee | |
| 2017/0206034 A1* | 7/2017 | Fetik | G06F 3/0604 |
| 2017/0206169 A1 | 7/2017 | Coppola et al. | |
| 2019/0065290 A1 | 2/2019 | Custodio et al. | |
| 2019/0095129 A1* | 3/2019 | Fetik | G06F 3/0653 |
| 2019/0096813 A1 | 3/2019 | Lesea | |
| 2019/0138493 A1 | 5/2019 | Teh et al. | |
| 2019/0146707 A1* | 5/2019 | Fetik | G06F 8/61 726/11 |
| 2020/0151120 A1 | 5/2020 | Thyamagondlu et al. | |
| 2020/0153756 A1 | 5/2020 | Thyamagondlu et al. | |
| 2021/0409335 A1* | 12/2021 | Zhu | H04L 47/24 |
| 2022/0116334 A1* | 4/2022 | Zhu | H04L 47/622 |
| 2022/0124043 A1* | 4/2022 | Zhu | H04L 47/2483 |
| 2022/0124588 A1* | 4/2022 | Zhu | H04W 76/16 |
| 2022/0197773 A1* | 6/2022 | Butler | H04N 21/234 |
| 2022/0345417 A1* | 10/2022 | Kasichainula | H04L 47/2441 |
| 2022/0350679 A1* | 11/2022 | Sukhomlinov | G06F 9/541 |

OTHER PUBLICATIONS

Abel, F., et al., "An FPGA Platform for Hyperscalers," In 2017 IEEE 25th Annual Symposium on High-Performance Interconnects (HOTI) Aug. 28, 2017 (pp. 29-32). IEEE.

Anderson, B., Detecting Encrypted Malware Traffic (Without Decryption), [online] Cisco Blog/Security, Jun. 23, 2017, retrieved from the Internet: <https://blogs.cisco.com/security/detecting-encrypted-malware-traffic-without-decryption>, 9. pg.

Chiou, D., "The Microsoft catapult project," In 2017 IEEE International Symposium on Workload Characterization (IISWC) Oct. 1, 2017 (pp. 124-124). IEEE.

Firestone, D. et al., "Azure Accelerated Networking: SmartNICs in the Public Cloud," In 15th {USENIX} Symposium on Networked Systems Design and Implementation ({NSDI} 18), 2018, pp. 51-66.

Liguori, A., "The Nitro Project: Next-Generation EC2 Infrastructure," AWS Tech Talks (webinar, talk with slides), Feb. 5, 2018. YouTube video.

Mellanox Technologies, "Mellanox Innova—2 Flex Open Programmable SmartNIC," 2018, Product Brochure MLNX54019PG, Rev. 1.4, 3 pg.

Microsoft, Inc., "Microsoft unveils Project Brainwave for real-time AI—Microsoft Research," [olnline] Microsoft © 2019, retrieved from the Internet: <https://www.microsoft.com/en-us/research/blog/microsoft-unveils-project-brainwave/>, 8 pg.

SolarFlare Communications, Inc., "SFA7942Q Dual-Port 40GbE QSFP+Halfl-Lenth ApplicationOnload Engine," 2015, Product Brochure SF-114649-CD Issue 3, 2 pg.

Xilinx Inc., White Paper WP499, Breathe New Life into Your Data Center with Alveo Adaptable Accelerator Cards, San Jose, CA USA.

Xilinx Inc.,White Paper WP505, Versal: The First Adaptive Compute Acceleration Platform (ACAP), San Jose, CA USA.

Xilinx, lnc.,"SDAccel Environment User Guide," UG1023 (v2018. 3), Jan. 24, 2019, 165 pg, San Jose, CA USA.

QDMA Subsystem for PCI Express v1 .O, Product Guide PG302 (v1 .0), Vivado Design Suite, Apr. 17, 2018, Xilinx, Inc., Copyright © 2018, San Jose, CA, 157 pg.

Sunkavalli, R., "Network Acceleration XDF 2018," Xilinx Developer Forum 2018 (Silicon Valley), Oct. 1, 2018, KP055684236, Retrieved from the Internet: <https:/lwww.xilinx.com/contenl/dam/xilinx/imgs/developer-forum/2018-ilicon-valley/Cloud-Converged-10-Acceleration-Platform.pdf>, retrieved Apr. 8, 2020, pp. 5-13.

* cited by examiner

234

| Connection ID | Metadata | | | | | |
|---|---|---|---|---|---|---|
| | Flow No. | Source VM | Source VF | Function | Destination VM | Destination VF |
| 0 | 0 | A | 0 | X | A | 0 |
| 1 | 0 | B | 1 | X | B | 1 |
| 2 | 1 | B | 1 | Y.0 | B | 2 |
| 3 | 1 | B | 2 | Y.1 | A | 0 |
| 4 | 2 | B | 2 | Y.0; Y.1 | A | 0 |

FIG. 4

TABLE BASED MULTI-FUNCTION VIRTUALIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to integrated circuits (ICs) and, more particularly, to sharing IC resources with multiple tenants.

BACKGROUND

Virtualization is often utilized within computing environments to make more efficient use of the hardware computing resources that are available. Examples of virtualization technologies include, but are not limited to, virtual machines and containers. Virtual machine technology utilizes a hypervisor to manage one or more virtual machines. Each virtual machine encapsulates a particular operating system and one or more applications. Virtual machine technology allows a single physical server, referred to as the host computer, to run different operating systems concurrently where each operating system (e.g., virtual machine) has its own set of applications. By comparison, containers execute on top of the operating system of the host computer. Each container typically includes only the software libraries necessary to execute the particular application in that container. Multiple containers executing on the same host computer will share the host operating system. A typical container is a fraction of the size of a virtual machine.

Hardware acceleration generally refers to implementing a particular task in hardware or circuitry in lieu of performing the task using a processor executing program code. A hardware accelerator refers to a circuit-based implementation of computer readable program instructions (e.g., program code). Thus, rather than execute program code on a processor to perform the task, the task is performed by the hardware accelerator. Hardware acceleration typically provides benefit(s) not attainable through execution of program code using a processor. The benefit(s) may be faster operation, reduced power consumption, redundancy, etc. Despite the fact that implementing an application as hardware provides benefits that may or may not include faster operation, the process of implementing an application in hardware is typically referred to as "hardware acceleration."

Within virtualized computing environments that use hardware acceleration, the hardware accelerator card within the host computer operates as a single tenant device. A single tenant device is a device that may only be used by one virtual entity (e.g., a virtual machine or container) or one user at a time. The hardware acceleration card, for example, must complete a task for a first tenant and be released by the first tenant prior to being accessed by a second and different tenant.

SUMMARY

In one aspect, a method can include receiving, within a communication endpoint of an IC, a plurality of packets from a plurality of different source virtual entities, determining packet handling data for each packet of the plurality of packets using an acceleration function table stored within the IC, routing each packet of the plurality of packets to one or more selected function circuit blocks of a plurality of function circuit blocks in the IC based on the packet handling data of each respective packet, processing the plurality of packets using the one more selected function circuit blocks generating a plurality of results corresponding to respective ones of the plurality of packets, and queueing, within the communication endpoint, the plurality of results, wherein each result is queued based on the packet handling data of the corresponding packet.

In another aspect, an IC can include a communication endpoint configured to receive a plurality of packets from a plurality of different source virtual entities, an ingress handler configured to determine packet handling data for each packet of the plurality of packets, and one or more function circuit blocks configured to operate on the plurality of packets and generate a plurality of results corresponding to respective ones of the plurality of packets. The ingress handler is capable of routing the plurality of packets to the one or more function circuit blocks based on the packet handling data for each packet of the plurality of packets. The IC further includes an egress handler configured to queue the plurality of results in a plurality of output queues of the communication endpoint. Each result is queued in an output queue of the plurality of output queues selected based on the packet handling data of the corresponding packet.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 4 illustrates an example of an acceleration function table.

DETAILED DESCRIPTION

Figure 1:
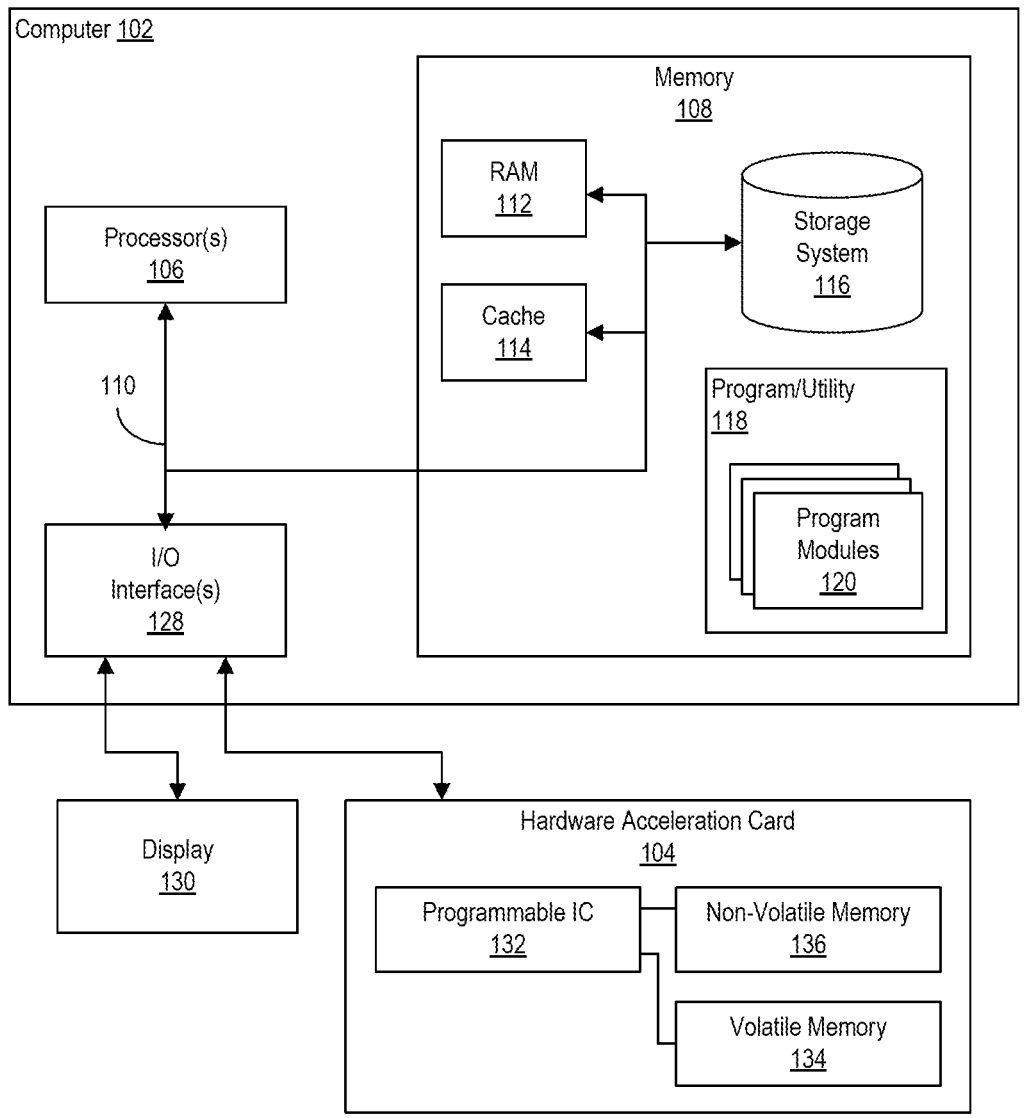
FIG. 1 illustrates an example computing environment for use with the inventive arrangements described within this disclosure.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to sharing IC resources with multiple tenants. In accordance with the inventive arrangements described within this disclosure, an IC, e.g., a programmable IC, may include a functional area that may be shared by multiple tenants simultaneously. The tenants may be virtual entities or users. Examples of virtual entities include virtual machines and containers. In one aspect, the functional area may be partitioned to implement multiple different functions concurrently. These different functions may be accessed by multiple tenants concurrently.

In conventional computing environments that offer hardware acceleration, a single virtual entity, e.g., a first virtual entity, owns (e.g., controls) the entire resource space of the IC used for hardware acceleration. The first virtual entity must relinquish control over the IC prior to another virtual entity, e.g., a second and different virtual entity, acquiring control over the IC. Once the second virtual entity acquires control over the IC, no other virtual entity may obtain control over the IC until such time that the second virtual entity relinquishes control. This scenario also applies to users.

Because of the foregoing limitations, server environments utilizing hardware acceleration typically dedicate different ICs to performing different functions or classes of functions. As an example, a first programmable IC used as a hardware accelerator may be configured to perform machine learning functions while a second programmable IC used as a hardware accelerator may be configured to perform video transcoding. A particular user application executing in a virtual entity, however, may require use of both machine learning and video transcoding functions. As noted, conventional hardware acceleration frameworks do not allow applications running in different virtual entities to share functions in the same IC. Thus, the application must offload functions to two different ICs in order to obtain both machine learning functions and video transcoding functions. This requires additional hardware and takes additional time to route the data between the two ICs (e.g., two different hardware accelerators).

The example implementations described within this disclosure provide, at least in part, an infrastructure that is implemented in the IC. This infrastructure allows multiple tenants to utilize resources of the IC concurrently. Further, in cases where one or more virtual entities require secure access to a logic area, the infrastructure facilitates a partitioning of the resources of a programmable IC that allows such virtual entities access to respective secure areas of logic.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example computing environment 100 for use with the inventive arrangements described within this disclosure. The computing environment includes a computer (e.g., a host system) 102 coupled to a hardware acceleration card (card) 104. The components of computer 102 may include, but are not limited to, one or more processors 106 (e.g., central processing units), a memory 108, and a bus 110 that couples various system components including memory 108 to processor(s) 106. Processor(s) 106 may include any of a variety of processors that are capable of executing program code. Example processor types include, but are not limited to, processors having an x86 type of architecture (IA-32, IA-64, etc.), Power Architecture, ARM processors, and the like.

Bus 110 is a communication bus that communicatively links processor(s) 106, I/O interfaces 128, and memory 108. For purposes of illustration, bus 110 may be implemented as a Peripheral Component Interconnect Express (PCIe) bus. It should be appreciated, however, that any of a variety of known communication bus architectures may be used in place of PCIe.

Computer 102 typically includes a variety of computer readable media. Such media may be any available media that is accessible by computer 102 and may include any combination of volatile media, non-volatile media, removable media, and/or non-removable media. For example, memory 108 may include computer readable media in the form of volatile memory, such as random-access memory (RAM) 112 and/or cache memory 114. Host system 102 may also include other removable/non-removable, volatile/non-volatile computer system storage media. By way of example, storage system 116 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each may be connected to bus 110 by one or more data media interfaces. As will be further depicted and described below, memory 108 may include at least one computer program product having a set (e.g., at least one) of program modules (e.g., program code) configured to carry out the functions and/or operations described within this disclosure.

For example, program/utility 118, having a set (at least one) of program modules 120 which may include, but are not limited to, an operating system, one or more application programs (e.g., user applications), other program modules, and/or program data, is stored in memory 108. Program modules 120 generally carry out the functions and/or methodologies as described herein at least with respect to operations performed by computer 102. For example, program modules 120 may implement a software stack. The software stack may implement a runtime environment capable of performing the computer 102 operations described herein. In one aspect, program modules 120 includes a driver or daemon capable of communicating with programmable IC 132.

Program modules 120 may include program code that implements a virtualized environment supporting one or more virtual entities. For example, program modules 120 may include a hypervisor supporting one or more virtual machines also embodied as one or more program modules 120 that may be executed by computer 102. In another example, program modules 120 may embody a containerized environment including one or more containers that may be executed by computer 102.

Program/utility 118 is executable by processor(s) 106. Program/utility 118 and any data items used, generated, and/or operated upon by processor(s) 106 are functional data structures that impart functionality when employed by processor(s) 106. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Host system 102 may include one or more Input/Output (I/O) interfaces 128 communicatively linked to bus 110. I/O interface(s) 128 allow computer 102 to communicate with external devices, couple to external devices that allow user(s) to interact with computer 102, couple to external devices that allow computer 102 to communicate with other computing devices, and the like. For example, computer 102 may be communicatively linked to a display 130 and to hardware acceleration card 104 through I/O interface(s) 128. Computer 102 may be coupled to other external devices such as a keyboard (not shown) via I/O interface(s) 128. Examples of I/O interfaces 128 may include, but are not limited to, network cards, modems, network adapters, hardware controllers, etc.

In an example implementation, the I/O interface 128 through which computer 102 communicates with hardware acceleration card 104 is a PCIe adapter. Hardware acceleration card 104 may be implemented as a circuit board that couples to computer 102. Hardware acceleration card 104 may, for example, be inserted into a card slot, e.g., an available bus and/or PCIe slot, of computer 102.

In a non-virtualized environment, hardware acceleration card 104 is "owned" by computer 102. In a virtualized environment, hardware acceleration card 104, in the conventional case, is owned by a single virtual entity at a time. This type of implementation is typically referred to as "pass-through mode." In such a configuration, computer 102 may include multiple PCIe cards. In pass-through mode, there may be a one-to-one relationship between PCIe cards and virtual entities or one virtual entity owning multiple PCIe cards. The inventive arrangements described within this disclosure allow one PCIe card, e.g., one programmable IC 132, to be shared and/or used by multiple tenants concurrently.

Hardware acceleration card 104 includes a programmable IC 132. An example of a programmable IC is a Field Programmable Gate Array (FPGA).

Hardware acceleration card 104 also includes volatile memory 134 coupled to programmable IC 132 and a non-volatile memory 136 also coupled to programmable IC 132. Volatile memory 134 may be implemented as a RAM that is external to programmable IC 132, but is still considered a "local memory" of programmable IC 132, whereas memory 108, being within computer 102, is not considered local to programmable IC 132. Non-volatile memory 136 may be implemented as flash memory. Non-volatile memory 136 is also external to programmable IC 132 and may be considered local to programmable IC 132.

It should be appreciated that hardware acceleration card 104 may be implemented as any of a variety of different types of cards depending on the functionality implemented in programmable IC 132. For example, programmable IC 132 may implement a Network Interface Controller (NIC). In other arrangements, programmable IC 132 may be replaced with another IC that is not programmable, but that includes the infrastructure described herein (e.g., in FIGS. 2 and/or 3) thereby allowing multiple tenants to share resources of the IC. Examples of such other ICs may include, but are not limited to, hardwired NICs and Graphics Processing Units (GPUs).

FIG. 1 is not intended to suggest any limitation as to the scope of use or functionality of the examples described herein. Computer 102 is an example of computer hardware that is capable of performing the various operations described within this disclosure relating to hardware acceleration card 104 and/or programmable IC 132.

Computer 102 is only one example implementation of a computer that may be used with a hardware acceleration card. Computer 102 is shown in the form of a computing device, e.g., a server. Computer 102 can be practiced as a standalone device, as a bare metal server, in a cluster, or in a distributed cloud computing environment. In a distributed cloud computing environment, tasks are performed by remote processing devices that are linked through a communications network. In a distributed cloud computing environment, program modules may be located in both local and remote computer system storage media including memory storage devices.

As used herein, the term "cloud computing" refers to a computing model that facilitates convenient, on-demand network access to a shared pool of configurable computing resources such as networks, servers, storage, applications, ICs (e.g., programmable ICs) and/or services. These computing resources may be rapidly provisioned and released with minimal management effort or service provider interaction. Cloud computing promotes availability and may be characterized by on-demand self-service, broad network access, resource pooling, rapid elasticity, and measured service.

Some computing environments, e.g., cloud computing environments and/or edge computing environments using computer 102 or other suitable data processing system, generally support the FPGA-as-a-Service (FaaS) model. In the FaaS model, user functions are hardware accelerated as circuit designs implemented within programmable ICs operating under control of the host system. Other examples of cloud computing models are described in the National Institute of Standards and Technology (NIST) and, more particularly, the Information Technology Laboratory of NIST.

Computer 102 is operational with numerous other general-purpose or special-purpose computing system environments or configurations. Examples of computing systems, environments, and/or configurations that may be suitable for use with computer 102 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 2:
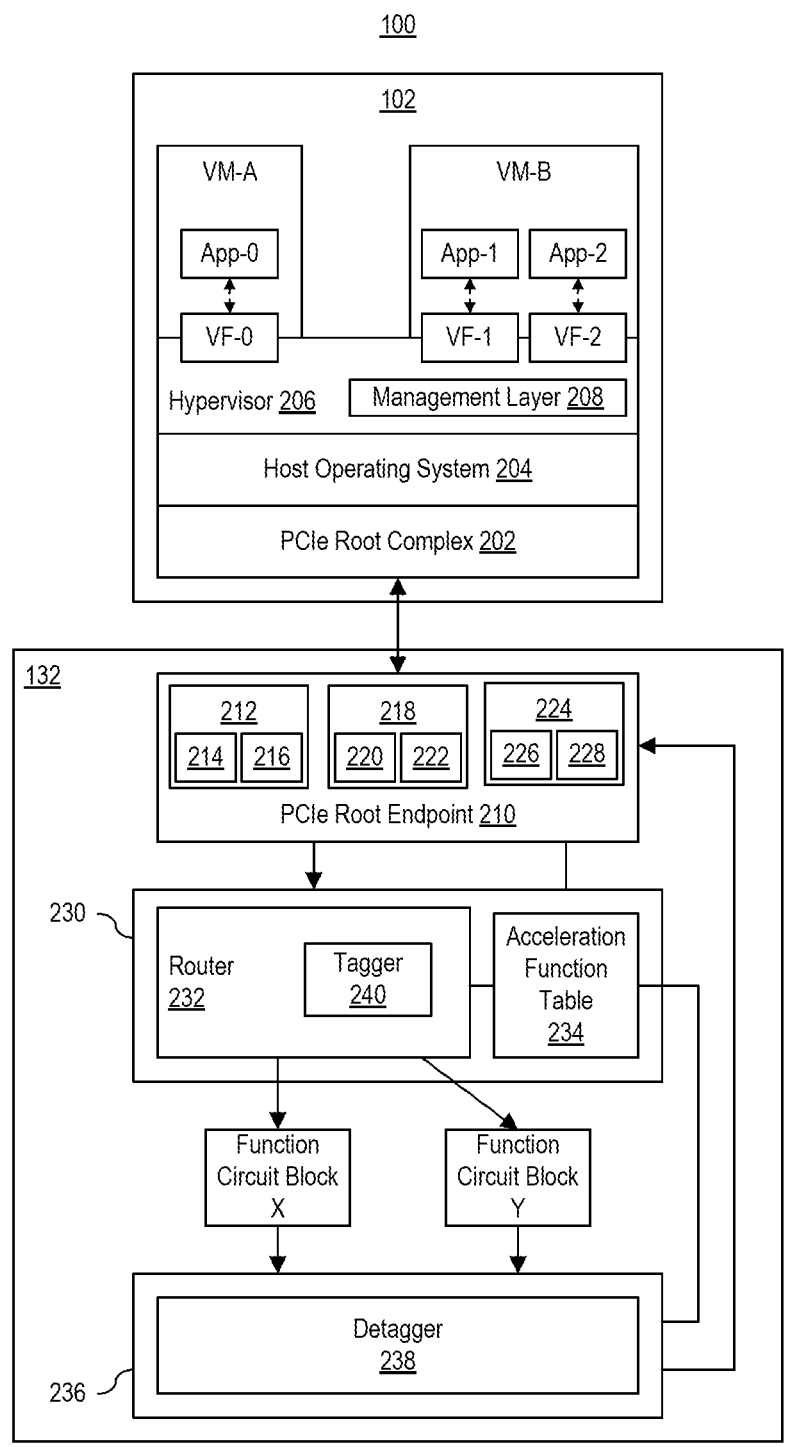
FIG. 2 illustrates an example implementation of the computing environment of FIG. 1.

FIG. 2 illustrates an example implementation of computing environment 100. In the example of FIG. 2, computer 102 includes a PCIe root complex 202, a host operating system 204, a hypervisor 206, and a management layer 208. PCIe root complex 202 is an example of I/O interfaces 128. Host operating system 204, hypervisor 206, and management layer 208 are examples of program modules 120. Computer 102 executes a plurality of virtual machines (e.g., program modules 120) denoted as VM-A and VM-B. VM-A executes an application denoted as App-0, while VM-B executes different applications denoted as App-1 and App-2. Each of applications App-0, App-1, and App-2 corresponds to a virtual function denoted as VF-0, VF-1, and VF-2, respectively. In the example of FIG. 2, VM-A/VF-0 represents a first virtual entity; VM-B/VF-1 represents a second, different virtual entity; and VM-B/VF-2 represents a third, different virtual entity. Each virtual entity is distinct.

Host operating system 204 is the operating system of computer 102. Hypervisor 206 is software executed by computer 102 that, when executed, abstracts virtual entities such as virtual machines (also referred to as "guest machines") and the operating system each virtual machine runs on from the actual hardware of computer 102. In one aspect, hypervisor 206 is implemented as a host hypervisor as shown that executes on top of host operating system 204. In another aspect, hypervisor 206 may be implemented as a bare metal hypervisor or native hypervisor. In the latter case of a bare metal hypervisor or native hypervisor, host operating system 204 is omitted.

In still another example implementation, hypervisor 206 may be a container management application. In that case, VM-A and VM-B may be omitted and replaced with containers. For example, VM-A and VM-B may be replaced with a first container executing App-0, a second container executing App-1, and a third container executing App-2. In this example, each container is considered a different virtual entity.

In the example of FIG. 2, hypervisor 206 associates each application executing in a virtual machine with a particular virtual function. A virtual function, for example, is the mechanism by which hypervisor 206 communicates with applications in the different virtual machines. The virtual functions have a one-to-one correspondence with applications. For example, App-0 corresponds to VF-0; App-1 corresponds to VF-1; and App-2 corresponds to VF-2. In the example of FIG. 2, App-0 corresponding to VF-0, is executed by VM-A. In some cases, however, a virtual machine may be shut down. In an example where VM-A is shut down, App-0 corresponding to VF-0 may not be executed by any other virtual machine or may be executed by a different virtual machine such as VM-B.

Management layer 208 may execute in hypervisor 206 or in coordination with hypervisor 206 as a separate layer. Management layer 208 is capable of managing hardware acceleration card 104 and programmable IC 132. Management layer 208 further manages interactions between computer 102 and/or the virtual entities executed therein and programmable IC 132. For example, management layer 208 is capable of performing operations such as tracking or keeping a log of a variety of different activities and, based on the activities, updating an acceleration function table 234 maintained within programmable IC 132.

With respect to programmable IC 132, examples of activities tracked by management layer 208 include, but are not limited to: which logic areas (e.g., function circuit blocks and/or partial reconfiguration regions) of programmable IC 132 are in use at any given time and/or which tasks (e.g., packets) are running on the various logic areas of programmable IC 132 at any given time. With respect to computer 102, examples of activities tracked by management layer 208 include, but are not limited to: which virtual machines are running at any given time and the virtual functions (e.g., applications) that are running in each virtual machine at any given time. Management layer 208 is capable of performing such tracking for containers in a containerized environment as well.

For example, hypervisor 206 and/or a driver therein, may notify management layer 208 that a particular virtual machine is being turned off. Management layer 208 tracks such notifications. Management layer 208 may also track notifications from hypervisor 206 and/or the driver therein that a particular (e.g., a new) virtual machine has been started. Similarly, management layer 208 may track notifications from hypervisor 206 indicating that an application (and corresponding virtual function) has been started or stopped in a particular virtual machine. By tracking such notifications or events, management layer 208 is capable of tracking movements of applications and virtual functions among different virtual machines.

Programmable IC 132 includes a PCIe Root Endpoint 210. PCIe Root Endpoint 210 (hereafter "endpoint 210") is an example of a communication endpoint and is provided for purposes of illustration. In other implementations, where computer 102 utilizes a different type of communication bus, endpoint 210 may be of a different variety that operates in a complementary manner with the communication endpoint in computer 102.

Endpoint 210 includes a plurality of queues 212, 218, and 224. In one aspect, endpoint 210 includes a number of queues equivalent to the number of virtual functions executing in computer 102. Thus, endpoint 210 may include fewer or more queues depending on the number of virtual functions active in computer 102. In this example, queue 212 corresponds to VF-0, queue 218 corresponds to VF-1, and queue 224 corresponds to VF-3. Each of queues 212, 218, and 224 may include an input queue and an output queue. Queue 212, for example, includes input queue 214 and output queue 216. Queue 218, for example, includes input queue 220 and output queue 222. Queue 224, for example, includes input queue 226 and output queue 228.

Management layer 208 is capable of directing packets sent from the virtual functions to the appropriate ones of the input queues. For example, packets from the source virtual entity VM-A/VF-0 are stored in input queue 214; packets from the source virtual entity VM-B/VF-1 are stored in input queue 220; and packets from VM-B/VF-2 are stored in input queue 226. Results (e.g., result packets) being output from programmable IC 132 are queued in the particular output queue corresponding to the destination virtual entity. For example, a result intended for destination virtual entity VM-A/VF-0 is stored in output queue 216; a result intended for destination virtual entity VM-B/VF-1 is stored in output queue 222; and a result intended for destination virtual entity VM-B/VF-2 is stored in output queue 228.

Programmable IC 132 also includes an ingress handler 230, one or more function circuit blocks (shown as function circuit block X and function circuit block Y), and an egress handler 236. Ingress handler 230 may include a router 232 and an acceleration function table 234. Egress handler 236 may include a detagger 238.

In an example implementation, router 232 is capable of reading packets from input queues 214, 220, and 226. The particular input queue from which a packet is read indicates the particular virtual entity from which the packet originated referred to as the source virtual entity. Router 232 is capable of looking up packet handling data for each packet received from computer 102 and read from input queues 214, 220, and/or 226.

In some example implementations, router 232 is capable of indexing into acceleration function table 234 using the particular input queue from which a packet was read since each input queue corresponds to a particular virtual entity (e.g., on a one-to-one basis). Router 232 is capable of locating an entry in acceleration function table 234 specifying packet routing data for the packet based on the input queue from which the packet was read. Acceleration function table 234 may be implemented as an addressable memory or a plurality of addressable registers storing different packet handling data. An example acceleration function table 234 is illustrated in FIG. 4.

In other example implementations, router 232 may read one or more data items from a header of each packet and use the data item(s) read from the header to locate an entry in acceleration function table 234 specifying packet handling data for the packet. For example, the router may use the source virtual machine, the source virtual function, and/or a flow number to locate an entry in acceleration function table 234 specifying packet handling data for the packet. In still other example implementations, router 232 may use a combination of the input queue from which the packet was read and one or more data items read from the header of the packet to locate an entry in acceleration function table 234 specifying packet handling data for the packet.

In the example of FIG. 2, router 232 includes a tagger circuit 240. While illustrated as being a part of router 232, in another example implementation, tagger circuit 240 may be implemented as a circuit block within ingress handler 230 that is separate from router 232. In any case, having obtained packet handling data for a particular packet, tagger circuit 240 is capable of adding an identifier specified in the packet handling data to the header of the packet. The identifier may be one that uniquely identifies the entry specifying the packet handling data within acceleration function table 234 for the packet. The identifier may be used by other downstream circuit blocks to more quickly index into acceleration function table 234 to locate the entry and retrieve the packet handling data for the packet to determine further routing of the packet and/or a result generated from processing the packet. In one example, tagger 240 prepends the identifier to the header of the packet.

In one aspect, the packet handling data for a packet may specify which function circuit block or blocks are to operate on the packet. Accordingly, based on the packet handling data for each respective packet, router 232 is capable of routing the packet to the correct function circuit block, e.g., either function circuit block X or function circuit block Y in this example. It should be appreciated that additional function circuit blocks may be included to which packets may be directed. Further, function circuit blocks may be daisy chained or cascaded together forming a "pipeline."

As an example, a first packet may be received from the source virtual entity VM-A/VF-0. Router 232 determines that the packet handling data for the first packet indicates that the first packet is to be processed by function circuit block X. Accordingly, tagger circuit 240 updates the header of the first packet with the identifier from the packet handling data for the first packet. Router 232 then forwards the first packet to function circuit block X. A second packet may be received from the source virtual entity VM-B/VF-1. Router 232 determines that the packet handling data for the second packet indicates that the second packet is to be processed by function circuit block Y. Accordingly, tagger circuit 240 updates the header of the second packet with a different identifier determined from the packet handling data for the second packet. Router 232 then forwards the second packet to function circuit block Y.

Function circuit block X and function circuit block Y each is capable of processing any packets received from router 232. Function circuit block X and function circuit block Y may operate independently of one another and, as such concurrently on packets from different source virtual entities. Each of function circuit blocks X and Y is capable of outputting results from the processing of any received packets to egress handler 236. In one aspect, each result generated by a function circuit block retains the identifier originally inserted by router 232. Thus, any packet output from function circuit block X or Y as a result will include the same identifier that was originally inserted into the packet from which the result(s) were generated.

Within egress handler 236, detagger 238 is capable of removing the identifier from the results received from function circuit blocks X and/or Y. Egress handler 236 is capable of using the removed identifier for a result, locating the entry specifying the packet handling data for the original packet (and the result now being processed), and queuing the result within the appropriate output queue of endpoint 210 based on the destination virtual entity specified by the packet handling data.

For example, egress handler 236 receives a result from function circuit block X processing the first packet. Detagger 238 removes the identifier from the result. Egress handler 236 uses the identifier to locate the entry in acceleration function table 234 specifying the packet handling data. If the packet handling data indicates that the result from processing the first packet is to be provided the destination virtual entity VM-A/VF-0, egress handler 236 stores the result, after having removed the identifier, in output queue 216, which corresponds to the destination virtual entity.

In another example, egress handler receives a result from function circuit block Y processing the second packet. Detagger 238 removes the identifier from the result. Egress handler 236 uses the identifier to locate the entry in acceleration function table 234 specifying the packet handling data. If the packet handling data indicates that the result from processing the second packet is to be provided to the destination virtual entity VM-B/VF-2, egress handler 236 stores the result, after having removed the identifier, in output queue 228.

In one aspect, the function circuit blocks implemented in programmable IC 132 may be implemented in programmable logic. As such, the particular function circuit block(s) implemented in programmable IC 132; the number of each such function circuit block; and the connectivity among the function circuit blocks, ingress handler 230, and egress handler 236 may be changed by implementing a different circuit design in programmable IC 132 using partial reconfiguration. Partial reconfiguration is a process where a region of programmable circuitry within the programmable IC referred to as a "partial reconfiguration region" or "PR region" may be dynamically reconfigured by loading a partial configuration bitstream into the programmable IC.

The partial configuration bitstream may specify different circuitry (e.g., one or more different function circuit blocks and/or connectivity) than previously implemented in the PR region. The partial configuration bitstream does not specify new and/or different circuitry for portions of programmable circuitry outside of the PR region. The PR region may undergo modification through partial reconfiguration, e.g., the loading of a partial configuration bitstream for the PR region, repeatedly where different partial configuration bitstreams specify different circuitry, while the other regions of the programmable circuitry of the programmable IC referred to as "static circuitry" or "static regions" continue to operate without interruption.

For example, each function circuit block may be implemented in a PR region. The circuitry within the PR region may be changed while programmable IC 132 continues to operate. Moreover, other circuit blocks outside of the PR region located in what is referred to as the "static region" may continue to operate uninterrupted. For example, endpoint 210, ingress handler 230, and egress handler 236 may be implemented using programmable logic, but in the static region that is outside of the PR region containing the function circuit blocks. As such, the function circuit blocks may be changed while endpoint 210, ingress handler 230, and egress handler 236 continue to operate. This allows programmable IC 132 to maintain an active communication link to computer 102 while any partial reconfiguration occurs.

In another aspect, each function circuit block or different combinations of function circuit blocks may be implemented in two or more different PR regions so that function circuit blocks in one or more PR regions may be changed while the other PR region(s) and static region continue to operate uninterrupted.

In still another aspect, one or more or any combination (including all) of endpoint 210, ingress handler 230, and egress handler 236 are implemented as hardwired circuit blocks, e.g., not using programmable logic of programmable IC 132.

Another role of management layer 208 is updating acceleration function table 234 with different (e.g., new or modified) packet handling data. Management layer 208, for example, may update acceleration function table 234 with different packet handling data in response to any of a variety of computer 102 related events and/or programmable IC 132 related events. For example, management layer 208 may update acceleration function table in response to a virtual machine being turned on (e.g., booted) and/or turned off, an application being executed and/or terminated, and/or a change in the function circuit block(s) and/or connectivity of the function circuit block(s) within programmable IC 132 (reconfiguration and/or partial reconfiguration of programmable IC 132).

Since management layer 208 is capable of updating acceleration function table 234 by writing to one or more available memory locations and/or registers, the update occurs rapidly and requires few resources of computer 102 since computer 102 is not involved in managing the data flows within programmable IC 132 beyond the updating of acceleration function table 234. In conventional virtualized environments where computer 102 (e.g., the host) is configured to manage streams of data to hardware accelerators, such management tasks may require up to 90% of the computer's computational resources. With the example implementations described herein, the management of packets is handled internally within programmable IC 132 thereby freeing up significant computational resources of computer 102.

Further, in accordance with the packet handling described in connection with FIG. 2 and to be described in connection with FIG. 3, the individual function circuit blocks need not be aware of any updates or update processes for acceleration function table 234. The function circuit blocks may be dynamically changed and acceleration function table 234 updated without each individual function circuit block being aware of any such change(s).

In another aspect, each function circuit block is configured to process a received packet as a single task. For example, the function circuit blocks do not support stateful operation. In illustration, if a function circuit block performs image recognition, the function circuit block may do so based on a single image received as a packet. The function circuit block need not maintain state for each image that is received and processed.

Figure 3:
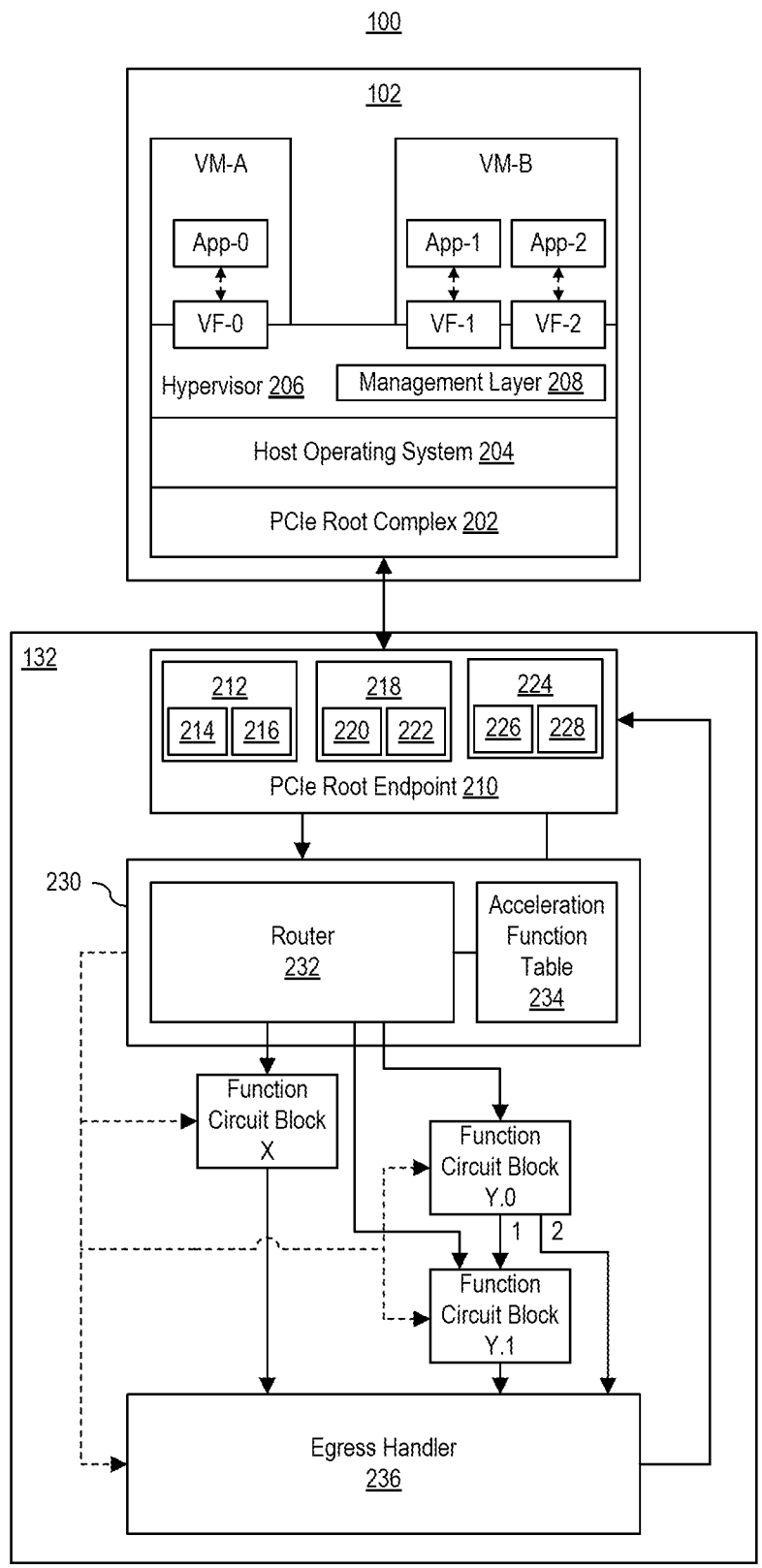
FIG. 3 illustrates another example implementation of the computing environment of FIG. 1.

FIG. 3 illustrates another example implementation of computing environment 100. The example of FIG. 3 is substantially similar to the example of FIG. 2. In the example of FIG. 3, however, the packet handling data is communicated by way of a side-band channel shown in dashed lines. Thus, in the example of FIG. 3, router 232 does not modify the packets by inserting an identifier that may be used by other circuit elements for looking up packet handling data. Instead, the packet handling data is communicated over the side-band channels in synchronization with the packets sent from router 232 and synchronized with any results generated from the function circuit blocks X, Y.0, and Y.1.

In the example of FIG. 3, using the side-band channel to convey packet handling information also allows more complex routing of packets and/or results among different combinations of function circuit blocks. For example, in the example of FIG. 3, packets may be processed by function circuit block X, by both function circuit block Y.0 and function circuit block Y.1, only by function circuit block Y.0, or only by function circuit block Y.1. In one aspect, the packet handling information communicated by the side-channels may also be provided to the function circuit blocks allowing each such function circuit block to make routing decisions. The routing allows function circuit blocks to be chained or cascaded with alternative data paths existing in the chained or cascaded function circuit blocks.

In illustration, function circuit block Y.0 may include a plurality of output ports. A first of the output ports connects to an input port of function circuit block Y.1. A second of the output ports of function circuit block Y.0 connects to egress handler 236, thereby bypassing function circuit block Y.1. In one example implementation, the packet handling data for a given packet may specify that the packet is to be processed only by function circuit block X; only by function circuit block Y.0, which causes function circuit block Y.0 to output results via the second output port; only by function circuit block Y.1; or by both function circuit blocks Y.0 and Y.1, which causes function circuit block Y.0 to output the result via the first output port.

In another aspect, the packet being processed may include routing data that may be used by the function circuit blocks indicating which particular output port to use in outputting a result. For example, the packet processed by function circuit block Y.0 may include data indicating whether the result should be output via output port 1 or output port 2. It should be appreciated that this technique, where some routing data is included in the packets and optionally carried forward in the generated results to specify particular output port(s) of function circuit blocks to use, may be used in the example implementation of FIG. 2. Such a technique allows the function circuit blocks to make routing determination without direct access to the packet handling data within acceleration function table 234.

Referring again to FIG. 3, egress handler 236 need not include a detagger since router 232 is not inserting any identifiers that need be removed from results. Further, egress handler 236 receives packet handling data for each result received so that the destination virtual entity may be determined for the result directly from the received packet handling data without looking up the packet handling data from acceleration function table 234. Based on the destination virtual entity specified in the packet handling data for the result corresponding to each packet that is processed, egress handler 236 stores the result in the appropriate output queue 216, 222, or 228.

The example architectures of FIGS. 2 and 3 are capable of processing packets from multiple, different tenants (e.g., source virtual entities and/or different users) concurrently. For example, a packet from a first tenant may be processed by function circuit block X while a packet from another tenant is processed by function circuit block Y. Such packets may co-exist in ingress handler 230 concurrently while results of processing such packets may co-exist in egress handler 236 concurrently.

FIG. 4 illustrates an example acceleration function table 234. In the example of FIG. 4, acceleration function table 234 includes a plurality columns including connection identifier (ID), flow number, source virtual machine, source virtual function, function, destination virtual machine, and destination virtual function. In general, for each packet that is received for processing from computer 102, the router indexes into acceleration function table 234 to a particular row therein that dictates the routing and processing to be performed for the packet. For example, each row specifies the packet handling data for a given packet.

The source virtual machine column indicates the particular virtual machine that sent, or originated, the packet in the host. The source virtual function indicates the particular virtual function that sent, or originated, the packet in the host. The destination virtual machine indicates the particular virtual machine to which a result from processing the packet is to be sent. The destination virtual function indicates the particular virtual function to which a result from processing the received packet is to be sent. As such, a result from processing a given packet can be returned to the source virtual machine and source virtual function, to the source virtual machine and a different virtual function (e.g., different virtual entity) in the source virtual machine, or to a different virtual machine and different virtual function (e.g., a different virtual entity).

The connection ID may be a value that uniquely identifies each row of the acceleration function table 234. In one aspect, the connection ID is used as the identifier inserted into the header of a packet as described in connection with FIG. 2. In one aspect, the connection ID column is optional.

The flow number may be used to represent any of a variety of different items of information. In one aspect, the flow number column is optional. In an example implementation, the flow number may specify the Internet Protocol (IP) address of a user. For example, in the case where an application executed by computer 102 within a virtual machine or a container is a Web server, the application may have a large number of users. In that case, each user is associated with a different IP address that may be used as the flow number. A first user may have an IP address of 10.0.0.10 specified as the flow number while a second and different user may have an IP address of 10.0.0.11 specified as the flow number. This allows packets from different users to be differentiated and potentially undergo different processing. In another example implementation, the flow number represents a Transmission Control Protocol/Internet Protocol (TCP/IP) port number. The particular type of information that may be represented by the flow number may vary based on the application(s) that are utilizing programmable IC 132.

The function column specifies the particular function circuit block(s) that are to be used to process the received packet. For purposes of illustration, acceleration function table 234 corresponds to the example of FIG. 3. The packet handling data specified in the row having connection ID 0 indicates that a packet corresponding to the row is processed by function circuit block X. For the row corresponding to connection ID 0, the source virtual entity is the same as the destination virtual entity (VM-A/VF-0). The packet handling data specified in the row having connection ID 1 indicates that a packet corresponding to the row is processed by function circuit block X. For the row corresponding to connection ID 1, the source virtual entity is the same as the destination virtual entity (VM-B/VF-1).

The packet handling data specified in the row having connection ID 2 indicates that a packet corresponding to the row is processed by function circuit block Y.0. The source virtual entity is different from the destination virtual entity. The packet handling data specified in the row having connection ID 3 indicates that a packet corresponding to the row is processed by function circuit block Y.1. The source virtual entity is different from the destination virtual entity. The packet handling data specified in the row having connection ID 4 indicates that a packet corresponding to the row is processed by function circuit blocks Y.0 and Y.1. Again, the source virtual entity is different from the destination virtual entity.

Packet handling data may be obtained from acceleration function table 234 using any of a variety of different mechanisms. In one aspect, each input queue of endpoint 210 is mapped to a particular row of acceleration function table 234. For example, since each queue is implemented as a memory having an address range, particular address ranges, corresponding to the queues, may be mapped to particular rows of acceleration function table 234. Accordingly, as the router reads each packet from a particular input queue, the router is capable of determining the packet handling data for the packet by accessing the row of acceleration function table 234 that corresponds to the address range of the input queue from which the packet was read.

In another aspect, the router may read the source virtual machine, source function, and/or another item of information such as the flow number from the packet header to determine the packet handling data for the packet from acceleration function table 234. Such a combination of items may uniquely specify a row of acceleration function table 234.

To the extent the router inserts the identifier into the packet header, e.g., prepends the identifier to the packet header, the router may determine the connection ID from acceleration function table 234 by indexing into the correct row as described. The router inserts the connection ID into the header of the packet as the identifier previously described.

Figure 5:
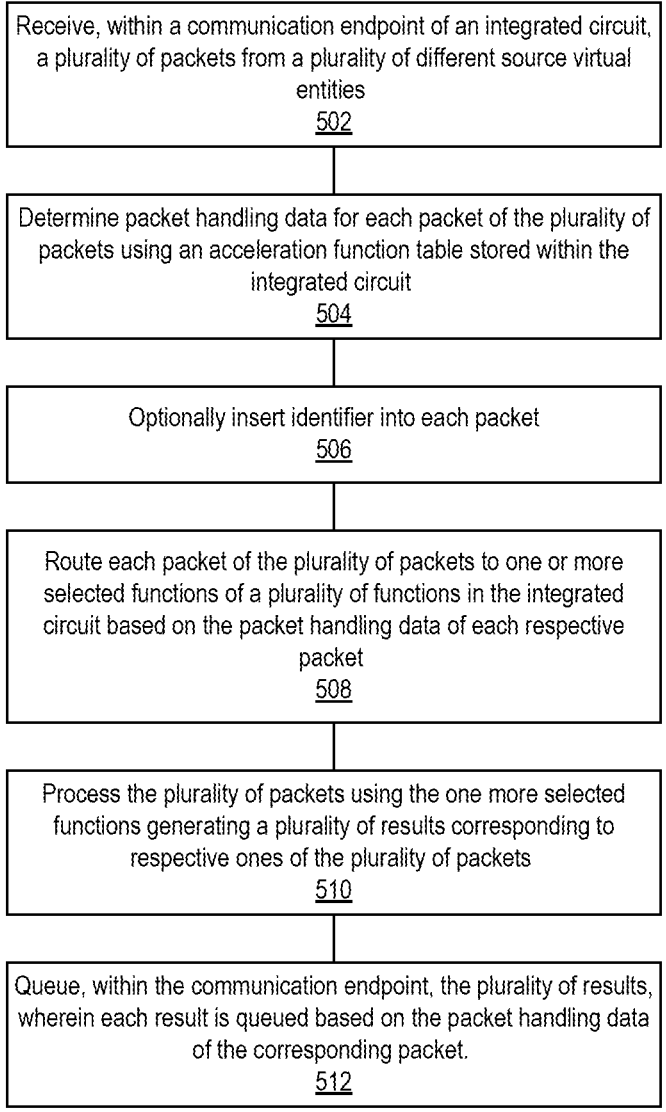
FIG. 5 illustrates an example method of operation for an integrated circuit (IC) used for hardware acceleration.

FIG. 5 illustrates an example method 500 of operation for an IC used for hardware acceleration. The IC may be any of a variety of different types of ICs used for purposes of hardware acceleration. An example of the IC is a GPU. In one aspect, the IC may be implemented as programmable IC 132, e.g., an FPGA. For purposes of discussion, the IC is used as a hardware accelerator as described herein within a computing environment as described in connection with FIGS. 1-4.

In block 502, the IC receives one or more packets from a computer (e.g., a host system). For example, the endpoint within the IC receives the packets. The packets may be from a plurality of different virtual entities referred to as source virtual entities. Further, the packets may be from a plurality of different users. Each of the packets is queued in a particular input queue that is determined based on the source virtual entity. For example, each virtual entity may be assigned a particular input queue. Packets are stored in the particular input queue corresponding to the source virtual entity.

In block 504, the router within the ingress handler of the IC determines packet handling data for each of the packets. The router may use an acceleration function table that is also implemented within the IC. As discussed, the router is capable of locating the correct packet handling data for each packet in any of a variety of different ways.

In one aspect, the router accesses a row in the acceleration function table associated with the input queue from which the packet was read. The row includes the packet handling data for the packet and/or results generated from the packet. In another aspect, the router may read information from the header of the packet and use such information to access a particular row in the acceleration function table to obtain the correct packet handling data for the packet and/or results generated from the packet. As noted, the router may also use a combination of data obtained from the header of the packet and the input queue to locate the correct row of packet handling data within the acceleration function table.

In block 506, the router optionally inserts an identifier into each packet. The router may insert the identifier at any of a variety of locations in each packet. For example, the router may prepend the identifier to each packet. The router is capable of prepending the identifier to the front of packet (e.g., the front of the header) so that the identifier is easily determined by downstream circuit blocks without parsing the entire packet or entire packet header thereby reducing processing time. In another example, the router may postpend the identifier to each packet. In another example, the router may insert the identifier between a header and a payload of each packet. In still another example, the router may insert the identifier within a header of each packet. The header for each packet may be specified in the packet handling data (e.g., the row of acceleration function table) corresponding to the packet. In one or more example implementations, the identifier may be the connection ID.

In block 508, the router routes each of the packets to one or more selected function circuit blocks implemented within the IC. The router is capable of routing each of the packets to one or more selected function circuit blocks implemented in within the IC based on the acceleration function table. As discussed, the acceleration function table specifies information regarding incoming traffic, which acceleration block to use, outgoing direction after the acceleration, and is dynamically programmable.

Accordingly, the router routes each packet based on the packet handling data for the respective packet. In one aspect, when the packets are updated to include the identifier, the packets, including the identifier, are routed to the selected function circuit blocks. In another aspect, where the packets are not updated to include the identifier, the router may send the packet handling data for the packets through a side channel. The packet handling data may be sent in synchronization with the packets, albeit over a different (e.g., distinct) and independent channel than the packets are sent. Via the side-band channel, downstream circuit blocks such as the function circuit blocks and/or the egress handler receives the packet handling data to further process and/or route the packets and/or results generated from packet processing.

In block 510, the various function circuit blocks process the packets that are received and generate results. The function circuit blocks forward the results to the egress handler or to other function circuit blocks based on the packet handling data and/or any routing data that may be specified within the packets themselves.

In block 512, the egress handler is capable of queuing the results generated by the function circuit blocks. The egress handler, for example, queues the results within particular output queues of the endpoint. In one aspect, when the packets have been updated with an identifier that is carried forward in the respective results, the egress handler looks up the packet handling data from the acceleration function table using the identifier. The egress handler stores the result in the output queue that corresponds to the particular destination virtual entity determined from the packet handling data corresponding to the identifier.

In the case where the router has updated the packets with the identifiers, the egress handler includes a detagger that is configured to remove the identifiers from the results prior to the egress handler queuing the results in the appropriate output queues.

In another aspect, where the packets are not updated with the identifier, the egress handler determines the destination virtual function from the packet handling data that is obtained for the result (e.g., synchronized with the result) by way of the side-band channel.

Once results are queued in the output queues, the computer is capable of retrieving results processing from the IC. It should be appreciated that the IC may continually perform the processing described where packets from different sources, whether different virtual entities or different users, are continually processed. In this regard, the IC may include packets in different stages of processing (e.g., in the endpoint, in the ingress handler, in the function circuit blocks, and/or in the egress handler) from multiple different tenants concurrently thereby facilitating the sharing of resources described.

Figure 6:
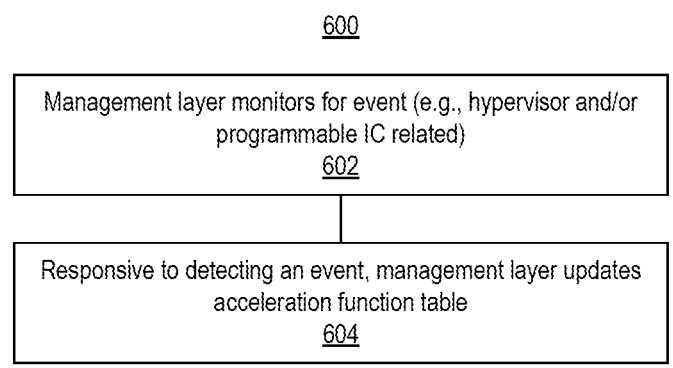
FIG. 6 illustrates an example method of maintaining an acceleration function table.

FIG. 6 illustrates an example method 600 of maintaining the acceleration function table. Method 600 may be performed by the computer and, in particular, by the management layer executing therein.

In block 602, the management layer is capable of monitoring for the occurrence of one or more events. The events may relate to the hypervisor and/or to the IC. With respect to the hypervisor, the events may indicate the starting and/or stopping of a virtual machine; the starting and/or stopping of an application (e.g., virtual function) in a virtual machine; and/or the starting and/or stopping of an application in a container. With respect to the IC, the events may relate to the reconfiguration and/or partial reconfiguration thereof resulting in a change to the function circuit block(s) implemented in the IC and/or the connectivity of such function circuit block(s).

In block 604, responsive to detecting an event, the management layer updates the acceleration function table with different packet handling data corresponding to the detected event. The different packet handling data will specify correct routing for received packets with respect to sources of packets, particular function circuit block(s) to be used to process packets, and/or the correct destinations for results.

It should be appreciated that the management layer is capable of updating the acceleration function table while the IC continues to operate. For example, in the case of a programmable IC, the IC need not be reconfigured or partially reconfigured to write different packet handling data to the acceleration function table. Rather, the management layer is capable of writing to the acceleration function table at any time responsive to an event and may do so rapidly to support any changes taking place in the computer and/or the programmable IC.

Figure 7:
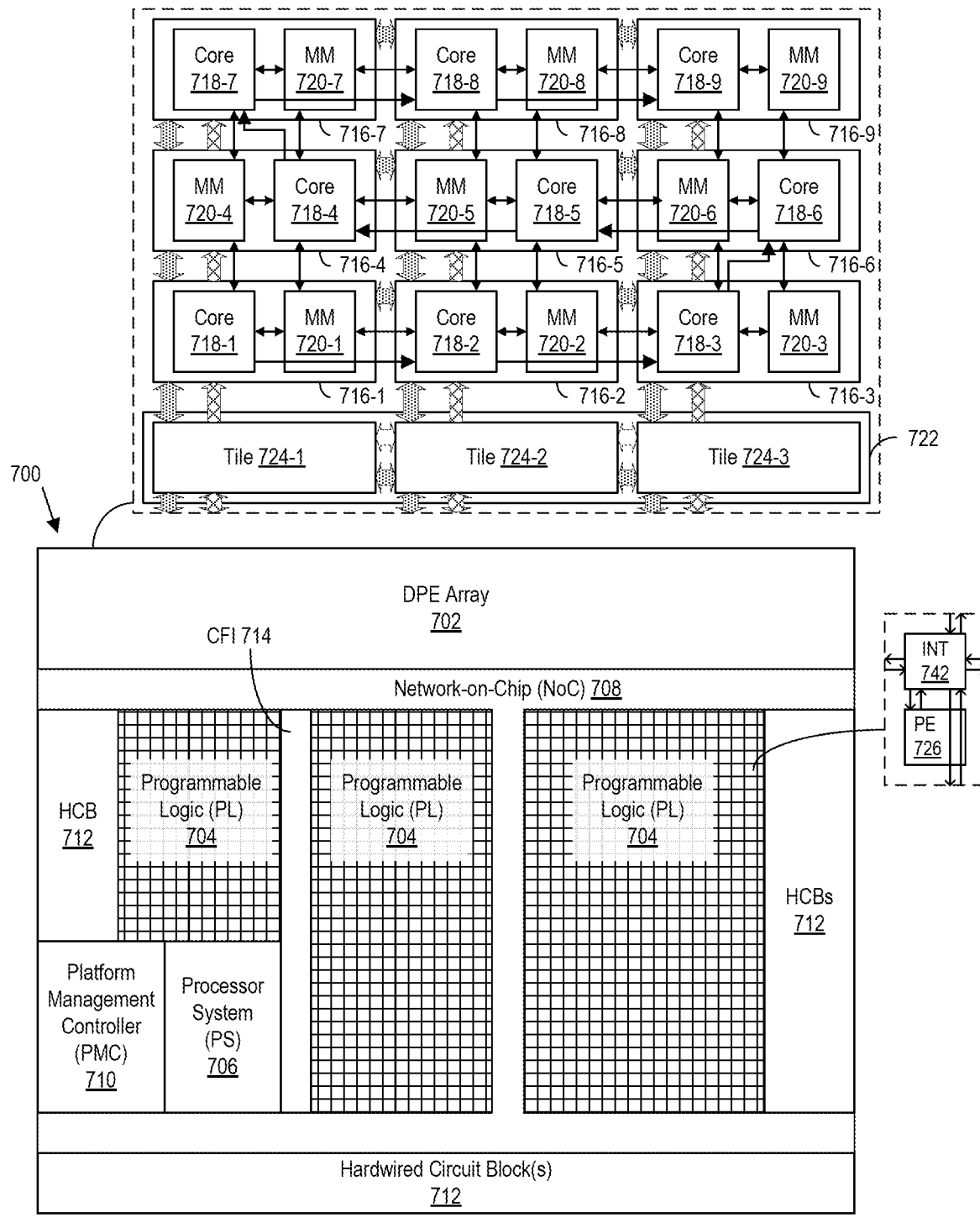
FIG. 7 illustrates an example architecture for an IC for hardware acceleration.

FIG. 7 illustrates an example architecture for a programmable device 700. Programmable device 700 is an example of a programmable IC and an adaptive system. In one aspect, programmable device 700 is also an example of a System-on-Chip (SoC). In the example of FIG. 7, programmable device 700 is implemented on a single die provided within a single integrated package. In other examples, programmable device 700 may be implemented using a plurality of interconnected dies where the various programmable circuit resources illustrated in FIG. 7 are implemented across the different interconnected dies.

In the example, programmable device 700 includes a data processing engine (DPE) array 702, programmable logic (PL) 704, a processor system (PS) 706, a Network-on-Chip (NoC) 708, a platform management controller (PMC) 710, and one or more hardwired circuit blocks 712. A configuration frame interface (CFI) 714 is also included.

DPE array 702 is implemented as a plurality of interconnected and programmable data processing engines (DPEs) 716. DPEs 716 may be arranged in an array and are hardwired. Each DPE 716 can include one or more cores 718 and a memory module (abbreviated "MM" in FIG. 7) 720. In one aspect, each core 718 is capable of executing program code stored in a core-specific program memory contained within each respective core (not shown). Each core 718 is capable of directly accessing the memory module 720 within the same DPE 716 and the memory module 720 of any other DPE 716 that is adjacent to the core 718 of the DPE 716 in the up, down, left, and right directions. For example, core 718-5 is capable of directly reading memory modules 720-5, 720-8, 720-6, and 720-2. Core 718-5 sees each of memory modules 720-5, 720-8, 720-6, and 720-2 as a unified region of memory (e.g., as a part of the local memory accessible to core 718-5). This facilitates data sharing among different DPEs 716 in DPE array 702. In other examples, core 718-5 may be directly connected to memory modules 720 in other DPEs.

DPEs 716 are interconnected by programmable interconnect circuitry. The programmable interconnect circuitry may include one or more different and independent networks. For example, the programmable interconnect circuitry may include a streaming network formed of streaming connections (shaded arrows), a memory mapped network formed of memory mapped connections (cross-hatched arrows).

Loading configuration data into control registers of DPEs 716 by way of the memory mapped connections allows each DPE 716 and the components therein to be controlled independently. DPEs 716 may be enabled/disabled on a per-DPE basis. Each core 718, for example, may be configured to access the memory modules 720 as described or only a subset thereof to achieve isolation of a core 718 or a plurality of cores 718 operating as a cluster. Each streaming connection may be configured to establish logical connections between only selected ones of DPEs 716 to achieve isolation of a DPE 716 or a plurality of DPEs 716 operating as a cluster. Because each core 718 may be loaded with program code specific to that core 718, each DPE 716 is capable of implementing one or more different kernels therein.

In other aspects, the programmable interconnect circuitry within DPE array 702 may include additional independent networks such as a debug network that is independent (e.g., distinct and separate from) the streaming connections and the memory mapped connections, and/or an event broadcast network. In some aspects, the debug network is formed of memory mapped connections and/or is part of the memory mapped network.

Cores 718 may be directly connected with adjacent cores 718 via core-to-core cascade connections. In one aspect, core-to-core cascade connections are unidirectional and direct connections between cores 718 as pictured. In another aspect, core-to-core cascade connections are bidirectional and direct connections between cores 718. Activation of core-to-core cascade interfaces may also be controlled by loading configuration data into control registers of the respective DPEs 716.

In an example implementation, DPEs 716 do not include cache memories. By omitting cache memories, DPE array 702 is capable of achieving predictable, e.g., deterministic, performance. Further, significant processing overhead is avoided since maintaining coherency among cache memories located in different DPEs 716 is not required. In a further example, cores 718 do not have input interrupts. Thus, cores 718 are capable of operating uninterrupted. Omitting input interrupts to cores 718 also allows DPE array 702 to achieve predictable, e.g., deterministic, performance.

SoC interface block 722 operates as an interface that connects DPEs 716 to other resources of programmable device 700. In the example of FIG. 7, SoC interface block 722 includes a plurality of interconnected tiles 724 organized in a row. In other examples, different architectures may be used to implement tiles 724 within SoC interface block 722 where each different tile architecture supports communication with different resources of programmable device 700. Tiles 724 are connected so that data may be propagated from one tile to another bi-directionally. Each tile 724 is capable of operating as an interface for the column of DPEs 716 directly above.

Tiles 724 are connected to adjacent tiles, to DPEs 716 immediately above, and to circuitry below using the streaming connections and the memory mapped connections as shown. Tiles 724 may also include a debug network that connects to the debug network implemented in DPE array 702. Each tile 724 is capable of receiving data from another source such as PS 706, PL 704, and/or another hardwired circuit block 712. Tile 724-1, for example, is capable of providing those portions of the data, whether application or configuration, addressed to DPEs 716 in the column above to such DPEs 716 while sending data addressed to DPEs 716 in other columns on to other tiles 724, e.g., 724-2 or 724-3, so that such tiles 724 may route the data addressed to DPEs 716 in their respective columns accordingly.

In one aspect, SoC interface block 722 includes two different types of tiles 724. A first type of tile 724 has an architecture configured to serve as an interface only between DPEs 716 and PL 704. A second type of tile 724 is has an architecture configured to serve as an interface between DPEs 716 and NoC 708 and also between DPEs 716 and PL 704. SoC interface block 722 may include a combination of tiles of the first and second types or tiles of only the second type.

PL 704 is circuitry that may be programmed to perform specified functions. As an example, PL 704 may be implemented as field programmable gate array type of circuitry. PL 704 can include an array of programmable circuit blocks. As defined herein, the term "programmable logic" means circuitry used to build reconfigurable digital circuits. Programmable logic is formed of many programmable circuit blocks sometimes referred to as "tiles" that provide basic functionality. The topology of PL 704 is highly configurable unlike hardwired circuitry. Each programmable circuit block of PL 704 typically includes a programmable element 726 (e.g., a functional element) and a programmable interconnect 742. The programmable interconnects 742 provide the highly configurable topology of PL 704. The programmable interconnects 742 may be configured on a per wire basis to provide connectivity among the programmable elements 726 of programmable circuit blocks of PL 704 and is configurable on a per-bit basis (e.g., where each wire conveys a single bit of information) unlike connectivity among DPEs 716, for example.

Examples of programmable circuit blocks of PL 704 include configurable logic blocks having look-up tables and registers. Unlike hardwired circuitry described below and sometimes referred to as hard blocks, these programmable circuit blocks have an undefined function at the time of manufacture. PL 704 may include other types of programmable circuit blocks that have also provide basic and defined functionality with more limited programmability. Examples of these circuit blocks may include digital signal processing blocks (DSPs), phase lock loops (PLLs), and block random access memories (BRAMs). These types of programmable circuit blocks, like others in PL 704, are numerous and intermingled with the other programmable circuit blocks of PL 704. These circuit blocks may also have an architecture that generally includes a programmable interconnect 742 and a programmable element 726 and, as such, are part of the highly configurable topology of PL 704.

Prior to use, PL 704, e.g., the programmable interconnect and the programmable elements, must be programmed or "configured" by loading data referred to as a configuration bitstream into internal configuration memory cells therein. The configuration memory cells, once loaded with a configuration bitstream, define how PL 704 is configured, e.g., the topology, and operates (e.g., particular functions performed). Within this disclosure, a "configuration bitstream" is not equivalent to program code executable by a processor or computer.

PS 706 is implemented as hardwired circuitry that is fabricated as part of programmable device 700. PS 706 may be implemented as, or include, any of a variety of different processor types each capable of executing program code. For example, PS 706 may be implemented as an individual processor, e.g., a single core capable of executing program code. In another example, PS 706 may be implemented as a multi-core processor. In still another example, PS 706 may include one or more cores, modules, co-processors, I/O interfaces, and/or other resources. PS 706 may be implemented using any of a variety of different types of architectures. Example architectures that may be used to implement PS 706 may include, but are not limited to, an ARM processor architecture, an x86 processor architecture, a graphics processing unit (GPU) architecture, a mobile processor architecture, a DSP architecture, combinations of the foregoing architectures, or other suitable architecture that is capable of executing computer-readable instructions or program code.

NoC 708 is a programmable interconnecting network for sharing data between endpoint circuits in programmable device 700. The endpoint circuits can be disposed in DPE array 702, PL 704, PS 706, and/or selected hardwired circuit blocks 712. NoC 708 can include high-speed data paths with dedicated switching. In an example, NoC 708 includes one or more horizontal paths, one or more vertical paths, or both horizontal and vertical path(s). The arrangement and number of regions shown in FIG. 7 is merely an example. NoC 708 is an example of the common infrastructure that is available within programmable device 700 to connect selected components and/or subsystems.

Within NoC 708, the nets that are to be routed through NoC 708 are unknown until a user circuit design is created for implementation within programmable device 700. NoC 708 may be programmed by loading configuration data into internal configuration registers that define how elements within NoC 708 such as switches and interfaces are configured and operate to pass data from switch to switch and among the NoC interfaces to connect the endpoint circuits. NoC 708 is fabricated as part of programmable device 700 (e.g., is hardwired) and, while not physically modifiable, may be programmed to establish connectivity between different master circuits and different slave circuits of a user circuit design. NoC 708, upon power-on, does not implement any data paths or routes therein. Once configured by PMC 710, however, NoC 708 implements data paths or routes between endpoint circuits.

PMC 710 is responsible for managing programmable device 700. PMC 710 is a subsystem within programmable device 700 that is capable of managing the other programmable circuit resources across the entirety of programmable device 700. PMC 710 is capable of maintaining a safe and secure environment, booting programmable device 700, and managing programmable device 700 during normal operations. For example, PMC 710 is capable of providing unified and programmable control over power-up, boot/configuration, security, power management, safety monitoring, debugging, and/or error handling for the different programmable circuit resources of programmable device 700 (e.g., DPE array 702, PL 704, PS 706, and NoC 708). PMC 710 operates as a dedicated platform manager that decouples PS 706 and from PL 704. As such, PS 706 and PL 704 may be managed, configured, and/or powered on and/or off independently of one another.

In one aspect, PMC 710 is capable of operating as a Root-of-Trust for the entirety of programmable device 700. As an example, PMC 710 is responsible for authenticating and/or validating device images containing configuration data for any of the programmable resources of programmable device 700 that may be loaded into programmable device 700. PMC 710 further is capable of protecting programmable device 700 against tampering during operation. By operating as the Root-of-Trust for programmable device 700, PMC 710 is capable of monitoring operation of PL 704, PS 706, and/or any other programmable circuit resources that may be included in programmable device 700. The Root-of-Trust capabilities, as performed by PMC 710, are distinct and separate from PS 706 and PL 704 and/or any operations performed by the PS 706 and/or PL 704.

In one aspect, PMC 710 is operated on a dedicated power supply. As such, PMC 710 is powered by a power supply that is separate and independent from the power supply of PS 706 and the power supply of PL 704. This power independence allows PMC 710, PS 706, and PL 704 to be protected from one another in terms of electrical noise and glitches. Further, one or both of PS 706 and PL 704 may be powered down (e.g., suspended or placed in hibernate mode) while PMC 710 continues to operate. This capability allows any portions of programmable device 700, e.g., PL 704, PS 706, NoC 708, etc., that have been powered down to wake and be restored to an operational state more quickly and without the need for the entirety of programmable device 700 to undertake a complete power-up and boot process.

PMC 710 may be implemented as a processor with dedicated resources.

PMC 710 may include multiple redundant processors. The processors of PMC 710 are capable of executing firmware. Use of firmware supports configurability and segmentation of global features of programmable device 700 such as reset, clocking, and protection to provide flexibility in creating separate processing domains (which are distinct from "power domains" that may be subsystem-specific). Processing domains may involve a mixture or combination of one or more different programmable circuit resources of programmable device 700 (e.g., wherein the processing domains may include different combinations or devices from DPE array 702, PS 706, PL 704, NoC 708, and/or other hardwired circuit blocks 712).

Hardwired circuit blocks 712 include special-purpose circuit blocks fabricated as part of programmable device 700. Though hardwired, hardwired circuit blocks 712 may be configured by loading configuration data into control registers to implement one or more different modes of operation. Examples of hardwired circuit blocks 712 may include input/output (I/O) blocks, transceivers for sending and receiving signals to circuits and/or systems external to programmable device 700, memory controllers, or the like. Examples of different I/O blocks may include single-ended and pseudo differential I/Os. Examples of transceivers may include high-speed differentially clocked transceivers. Other examples of hardwired circuit blocks 712 include, but are not limited to, cryptographic engines, digital-to-analog converters (DACs), analog-to-digital converters (ADCs), and the like. In general, hardwired circuit blocks 712 are application-specific circuit blocks.

CFI 714 is an interface through which configuration data, e.g., a configuration bitstream, may be provided to PL 704 to implement different user-specified circuits and/or circuitry therein. CFI 714 is coupled to and accessible by PMC 710 to provide configuration data to PL 704. In some cases, PMC 710 is capable of first configuring PS 706 such that PS 706, once configured by PMC 710, may provide configuration data to PL 704 via CFI 714. In one aspect, CFI 714 has a built in cyclic redundancy checking (CRC) circuitry (e.g., CRC 32-bit circuitry) incorporated therein. As such, any data that is loaded into CFI 714 and/or read back via CFI 714 may be checked for integrity by checking the values of codes attached to the data.

The various programmable circuit resources illustrated in FIG. 7 may be programmed initially as part of a boot process for programmable device 700. During runtime, the programmable circuit resources may be reconfigured. In one aspect, PMC 710 is capable of initially configuring DPE array 702, PL 704, PS 706, and NoC 708. At any point during runtime, PMC 710 may reconfigure all or a portion of programmable device 700. In some cases, PS 706 may configure and/or reconfigure PL 704 and/or NoC 708 once initially configured by PMC 710.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "processor" means at least one hardware circuit. The hardware circuit may be configured to carry out instructions contained in program code. The hardware circuit may be an integrated circuit or embedded in an integrated circuit.

As defined herein, the term "output" means storing in physical memory elements, e.g., devices, writing to display or other peripheral output device, sending or transmitting to another system, exporting, or the like.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, a "tenant" of an IC used for hardware acceleration means a virtual entity and/or a user.

As defined herein, a "virtual entity" means a virtual machine-virtual function pair or a container.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

In one aspect, a method can include receiving, within a communication endpoint of an IC, a plurality of packets from a plurality of different source virtual entities, determining packet handling data for each packet of the plurality of packets using an acceleration function table stored within the IC, routing each packet of the plurality of packets to one or more selected function circuit blocks of a plurality of function circuit blocks in the IC based on the packet handling data of each respective packet, processing the plurality of packets using the one more selected function circuit blocks generating a plurality of results corresponding to respective ones of the plurality of packets, and queueing, within the communication endpoint, the plurality of results, wherein each result is queued based on the packet handling data of the corresponding packet.

The foregoing and other implementations can each optionally include one or more of the following features, alone or in combination. In particular, one implementation includes all the following features in combination.

In another aspect, the queueing includes storing each result of the plurality of results in an output queue selected from a plurality of output queues of the communication endpoint based on the packet handling data of the corresponding packet.

In another aspect, for each result, the output queue selected from the plurality of output queues corresponds to a destination virtual entity determined from the packet handling data of the corresponding packet.

In another aspect, the source virtual entity of at least one of the plurality of packets is different than the destination virtual entity for the result corresponding to the packet.

In another aspect, the source virtual entity of at least one of the plurality of packets is the destination virtual entity for the result corresponding to the packet.

In another aspect, the packet handling data of each packet is communicated, via a side channel, to an egress handler configured to perform the queuing, wherein the side channel is distinct from a channel over which the egress handler receives the plurality of results.

In another aspect, the method can include, prior to the routing, adding an identifier to each packet of the plurality of packets. Each identifier specifies the packet handling data for the packet and is preserved in the result corresponding to the packet. The queueing can be performed by an egress handler configured to remove the identifiers from the plurality of results and store each result of the plurality of results subsequent to removal of the identifier within an output queue selected from a plurality of output queues of the communication endpoint based on the removed identifier, wherein each selected output queue corresponds to a destination virtual entity for the result.

In another aspect, the method includes updating the acceleration function table in response to detecting an event.

In another aspect, a particular function circuit block of the one or more selected function circuit blocks includes a plurality of output ports, receives at least one of the plurality of packets and the packet handling data corresponding to the at least one of the plurality of packets, and outputs the result for the at least one of the plurality of packets through a particular output port selected from the plurality of output ports based on the packet handling data corresponding to the at least one of the plurality of packets.

In another aspect, at least two of the plurality of packets originate from different users.

In another aspect, an IC can include a communication endpoint configured to receive a plurality of packets from a plurality of different source virtual entities, an ingress handler configured to determine packet handling data for each packet of the plurality of packets, and one or more function circuit blocks configured to operate on the plurality of packets and generate a plurality of results corresponding to respective ones of the plurality of packets. The ingress handler is capable of routing the plurality of packets to the one or more function circuit blocks based on the packet handling data for each packet of the plurality of packets. The IC further includes an egress handler configured to queue the plurality of results in a plurality of output queues of the communication endpoint. Each result is queued in an output queue of the plurality of output queues selected based on the packet handling data of the corresponding packet.

The foregoing and other implementations can each optionally include one or more of the following features, alone or in combination. In particular, one implementation includes all the following features in combination.

In another aspect, the ingress handler includes an acceleration function table storing the packet handling data for each of the plurality of packets and a router configured to determine the packet handling data for each of the plurality of packets using the acceleration function table. The router provides each packet of the plurality of packets to the one or more function circuit blocks based on the packet handling data of each respective packet.

In another aspect, the router updates the acceleration function table in response to detecting an event.

In another aspect, for each result, the output queue selected from the plurality of output queues corresponds to a destination virtual entity determined from the packet handling data of the corresponding packet.

In another aspect, the source virtual entity of at least one of the plurality of packets is different than the destination virtual entity for the result corresponding to the packet.

In another aspect, the source virtual entity of at least one of the plurality of packets is the destination virtual entity for the result corresponding to the packet.

In another aspect, the packet handling data of each packet is communicated from the ingress handler, via a side channel, to the egress handler, wherein the side channel is distinct from a channel over which the egress handler receives the plurality of results.

In another aspect, the ingress handler includes a tagging circuit configured to, prior to the routing, add an identifier to each packet of the plurality of packets, wherein each identifier specifies the packet handling data for the packet and is preserved in the result corresponding to the packet. The egress handler can include a detagger configured to remove the identifiers from the plurality of results. The egress handler stores each result of the plurality of results subsequent to removal of the identifier within the selected egress queue based on the removed identifier. Each selected egress queue corresponds to a destination virtual entity for the result.

In another aspect, a particular function circuit block of the one or more selected function circuit blocks includes a plurality of output ports, receives at least one of the plurality of packets and the packet handling data corresponding to the at least one of the plurality of packets, and outputs the result for the at least one of the plurality of packets through a particular output port selected from the plurality of output ports based on the packet handling data corresponding to the at least one of the plurality of packets.

In another aspect, at least two of the plurality of packets originate from different users.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method, comprising:
   receiving, by a communication endpoint of an integrated circuit, a plurality of packets from a plurality of different source virtual entities;

determining, by an ingress handler of the integrated circuit, packet handling data for the plurality of packets using an acceleration function table stored within the integrated circuit;

wherein the acceleration function table includes a plurality of entries each specifying a source virtual entity, one or more selected ones of a plurality of function circuit blocks of the integrated circuit, and a destination virtual entity;

routing, using the ingress handler, each packet of the plurality of packets to the one or more selected ones of the plurality of function circuit blocks in the integrated circuit based on a matching entry of the acceleration function table;

processing the plurality of packets using the one or more selected ones of the plurality of function circuit blocks for respective ones of the plurality of packets generating a plurality of results corresponding to the respective ones of the plurality of packets; and queueing, using an egress handler of the integrated circuit, the plurality of results, wherein each result is queued based on the packet handling data of the corresponding packet.

2. The method of claim 1, wherein the queueing comprises storing each result of the plurality of results in an output queue selected from a plurality of output queues of the communication endpoint based on the packet handling data of the corresponding packet.

3. The method of claim 2, wherein, for each result, the output queue selected from the plurality of output queues corresponds to a destination virtual entity determined from the packet handling data of the corresponding packet.

4. The method of claim 3, wherein the source virtual entity of at least one of the plurality of packets is different than the destination virtual entity for the result corresponding to the packet.

5. The method of claim 3, wherein the source virtual entity of at least one of the plurality of packets is the destination virtual entity for the result corresponding to the packet.

6. The method of claim 1, wherein the packet handling data of each packet is communicated, via a side channel, to an egress handler that performs the queuing, wherein the side channel is distinct from a channel over which the egress handler receives the plurality of results.

7. The method of claim 1, further comprising:

prior to the routing, adding an identifier to each packet of the plurality of packets, wherein each identifier specifies the packet handling data for the packet and is preserved in the result corresponding to the packet; and wherein the queueing is performed by an egress handler that removes the identifiers from the plurality of results and stores each result of the plurality of results subsequent to removal of the identifier within an output queue selected from a plurality of output queues of the communication endpoint based on the removed identifier, wherein each selected output queue corresponds to a destination virtual entity for the result.

8. The method of claim 1, further comprising:

updating the acceleration function table in response to detecting an event.

9. The method of claim 1, wherein a particular function circuit block of the one or more selected ones of the plurality of function circuit blocks includes a plurality of output ports, receives at least one of the plurality of packets and the packet handling data corresponding to the at least one of the plurality of packets, and outputs the result for the at least one of the plurality of packets through a particular output port selected from the plurality of output ports based on the packet handling data corresponding to the at least one of the plurality of packets.

10. The method of claim 1, wherein at least two of the plurality of packets originate from different users.

11. An integrated circuit, comprising:

a communication endpoint configured to receive a plurality of packets from a plurality of different source virtual entities of a host data processing system communicatively linked to the integrated circuit;

a plurality of function circuit blocks configured to operate on the plurality of packets and generate a plurality of results corresponding to respective ones of the plurality of packets;

an ingress handler configured to determine packet handling data for the plurality of packets using an acceleration function table stored within the integrated circuit;

wherein the acceleration function table includes a plurality of entries each specifying a source virtual entity, one or more selected ones of the plurality of function circuit blocks of the integrated circuit, and a destination virtual entity;

wherein the ingress handler routes the plurality of packets to one or more selected ones of the plurality of function circuit blocks based on matching entries of the acceleration function table; and an egress handler configured to queue the plurality of results in a plurality of output queues of the communication endpoint, wherein each result is queued in an output queue of the plurality of output queues selected based on the packet handling data of the corresponding packet.

12. The integrated circuit of claim 11, wherein the ingress handler comprises:

a router configured to determine the packet handling data for each of the plurality of packets using the acceleration function table, wherein the router provides each packet of the plurality of packets to one or more of the plurality of function circuit blocks based on the packet handling data of each respective packet.

13. The integrated circuit of claim 12, wherein the router updates the acceleration function table in response to detecting an event.

14. The integrated circuit of claim 11, wherein, for each result, the output queue selected from the plurality of output queues corresponds to a destination virtual entity determined from the packet handling data of the corresponding packet.

15. The integrated circuit of claim 14, wherein the source virtual entity of at least one of the plurality of packets is different than the destination virtual entity for the result corresponding to the packet.

16. The integrated circuit of claim 14, wherein the source virtual entity of at least one of the plurality of packets is the destination virtual entity for the result corresponding to the packet.

17. The integrated circuit of claim 11, wherein the packet handling data of each packet is communicated from the ingress handler, via a side channel, to the egress handler, wherein the side channel is distinct from a channel over which the egress handler receives the plurality of results.

18. The integrated circuit of claim 11, wherein:

the ingress handler includes a tagging circuit configured to, prior to the routing, add an identifier to each packet of the plurality of packets, wherein each identifier specifies the packet handling data for the packet and is preserved in the result corresponding to the packet; and the egress handler includes a detagger configured to remove the identifiers from the plurality of results, wherein the egress handler stores each result of the plurality of results subsequent to removal of the identifier within a selected egress queue based on the removed identifier, wherein each selected egress queue corresponds to a destination virtual entity for the result.

19. The integrated circuit of claim 11, wherein a particular function circuit block of the one or more selected ones of the plurality of function circuit blocks includes a plurality of output ports, receives at least one of the plurality of packets and the packet handling data corresponding to the at least one of the plurality of packets, and outputs the result for the at least one of the plurality of packets through a particular output port selected from the plurality of output ports based on the packet handling data corresponding to the at least one of the plurality of packets.

20. The integrated circuit of claim 11, wherein at least two of the plurality of packets originate from different users.

* * * * *